United States Patent Office 3,089,839
Patented May 14, 1963

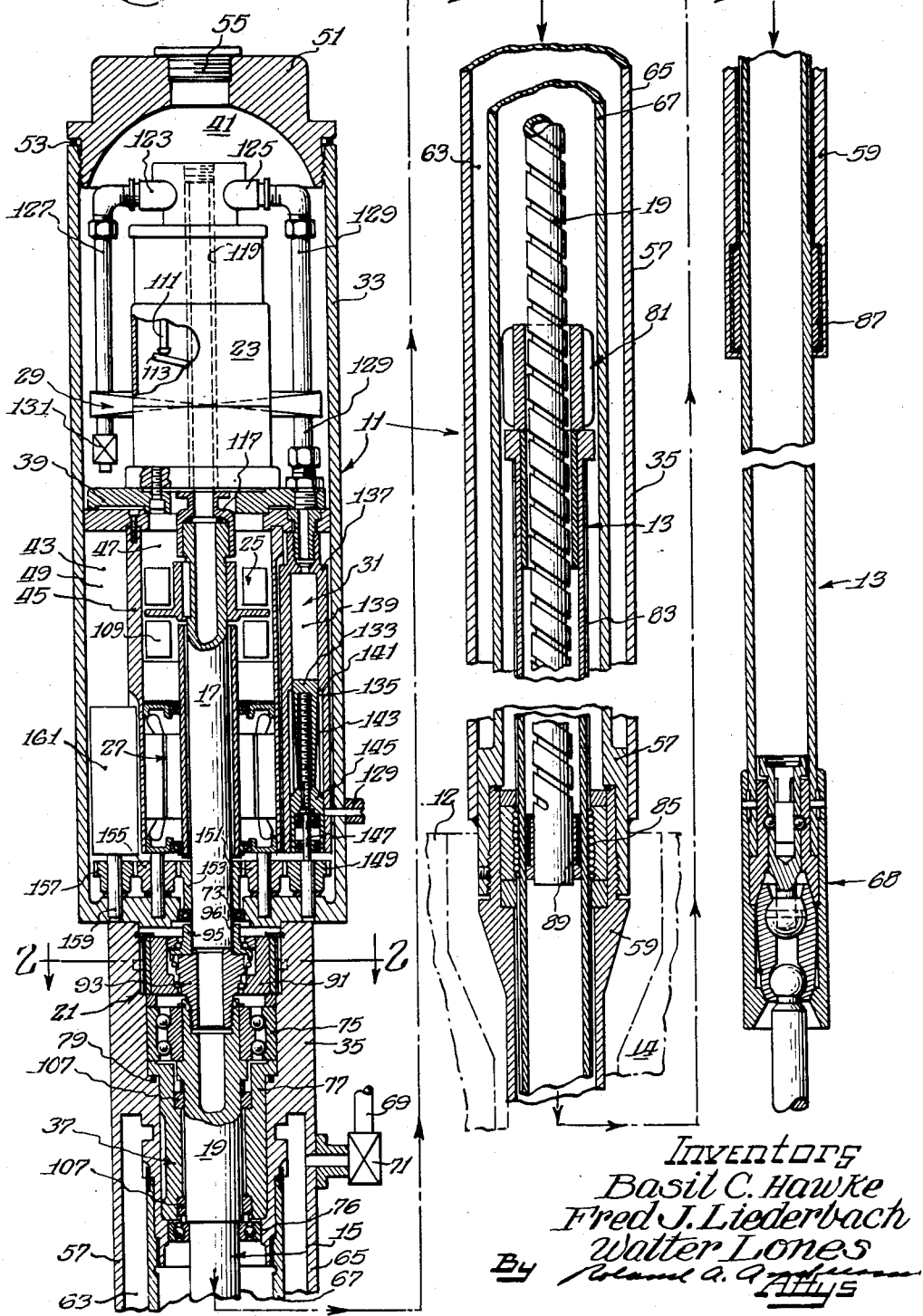

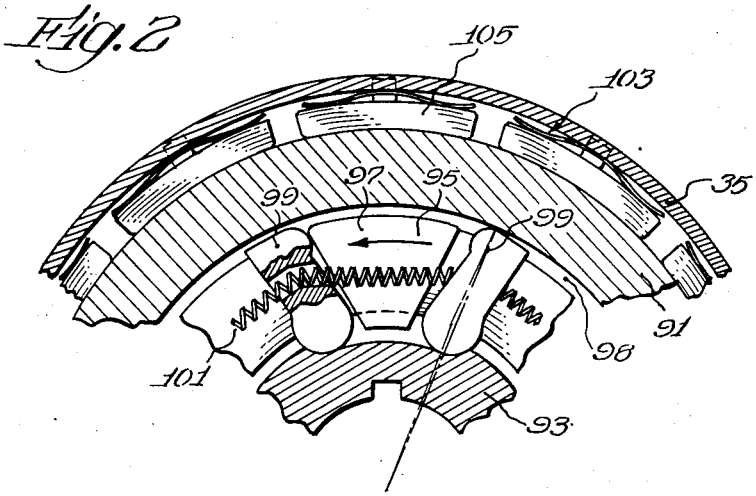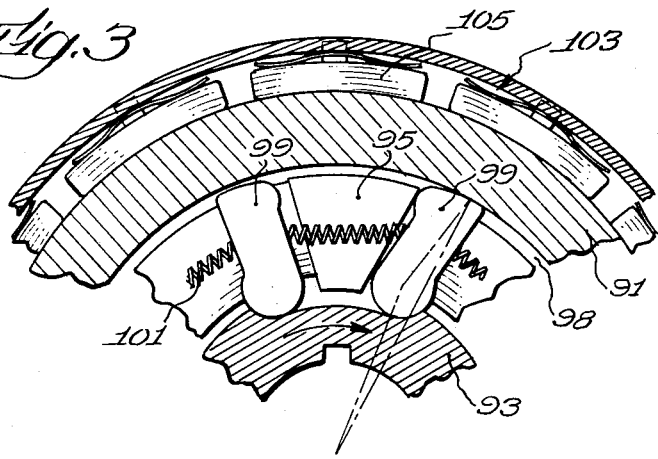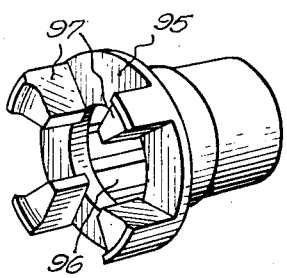

3,089,839
CONTROL ROD DRIVE MECHANISM FOR A NUCLEAR REACTOR
Basil C. Hawke, San Diego, Calif., Fred J. Liederbach, Philadelphia, Pa., and Walter Lones, San Diego, Calif., assignors, by mesne assignments, to the United States of America as represented by the United States Atomic Energy Commission
Filed Aug. 23, 1961, Ser. No. 133,534
4 Claims. (Cl. 204—193.2)

The invention relates to control rod drives for nuclear reactors. More specifically, the invention relates to control rod drives which utilize pressure fluid to "scram" one or more control rods to their fully inserted positions within the reactive core of a reactor.

The use of control rods and associated drives to regulate the reactivity of a nuclear reactor by varying the location of the control rods with respect to the reactive core is well known. In general, such drives are capable, under normal conditions, of gradually inserting and withdrawing one or more associated control rods so as to regulate the power output of the reactor. With a view toward the possibility of an emergency condition arising, as by an unexpected rise in reactivity, such drives also generally include arrangements for "scraming" the control rods, i.e., for rapid full insertion of the control rods into the reactive core to quickly shut down the reactor.

The control rod drive disclosed herein provides for positive positioning of an associated control rod under normal operating conditions, as well as under "scram" conditions. In addition, the disclosed drive incorporates an improved arrangement for utilizing pressure fluid to positively drive the control rods "home," i.e., into the reactive core, under "scram" conditions. Among other advantages, the drive disclosed herein also provides for deceleration of the inward travel of the control rod as it approaches its fully inserted position and the prevention of unwanted axial displacement of the control rod. Accordingly, the principal object of the invention is the provision of a new and improved control rod drive. Another object of the invention is the provision of an improved control rod drive which utilizes pressure fluid to fully insert an associated control rod into the reactive core under "scram" conditions.

Another object of the invention is the provision of a control rod drive which is generally suited for use in a gas cooled maritime-type reactor. Other objects and advantages of the invention will become known by reference to the following description and the accompanying drawings of one embodiment of the invention.

In the drawings,

FIGURE 1 is a fragmentary elevational view, partially broken away and in section, showing a control rod drive incorporating various of the features of the invention;

FIGURE 2 is an enlarged fragmentary sectional view, which is partially broken away for greater clarity, which is taken generally along line 2—2 of FIG. 1, and which shows the disposition of various of the components of the "back-stop" clutch when driven by the input member;

FIGURE 3 is a view similar to FIG. 2, showing the disposition of various of the components of the "back-stop" clutch when the clutch "binds" to prevent "feedback" rotation; and FIGURE 4 is an enlarged perspective view of the input member of the "back-stop" clutch.

As shown in FIG. 1, the control rod drive includes generally a containment 11 which is mounted on the shield 12 of a reactor 14 and which encloses various of the operating components of the control rod drive. These components generally include a drive or extension shaft 13 which is carried by the containment 11 for axial movement toward and away from the reactive core of the reactor, and a lead screw 19 coupled to the drive shaft through suitable means so as to cause axial movement of the drive shaft incident to rotation of the lead screw. The lead screw is drivingly connected to a connecting shaft 17 through a "back-stop" clutch 21 so as to prevent unwanted axial displacement of the drive shaft, as will be explained fully. The connecting shaft 17 is detachably connected to the "back-stop" clutch 21 for the same reason and also to facilitate disconnection of the upper and lower sections of the control rod drive.

Under "scram" conditions, the lead screw is driven by a fluid "scram" motor 23 which is coupled directly to the connecting shaft 17. Under normal conditions, the lead screw is driven by a positioning motor 27 which is coupled through a clutch 25 to the connecting shaft 17. The clutch 25 is operable to disconnect the positioning motor 27 from the connecting shaft 17 incident to "scram" operation of the fluid motor 13, thereby disconnecting the driving relation of the positioning motor 27 to the lead screw 19. Also included in the control rod drive is means including a "scram" valve 29 for supplying pressure fluid to the fluid motor in response to the development of a "scram" condition in the reactor, thereby rotating the lead screw so as to axially displace the drive shaft 13 rapidly toward the reactive core, and means including a modulating or throttling valve 31 for controlling the operation of the "scram" motor 23 to decelerate "scram" advancement of the drive shaft as the control rod reaches its fully inserted position. Preferably, the pressure fluid is a gas such as helium.

More specifically, the containment 11 incorporates an upper or thimble section 33 and a lower containment section 35 which are detachably connected, as by a series of bolts (not shown), to permit removal of the upper section from the lower section. The upper section 33 generally encloses the motors 23 and 27 as well as the connecting shaft 17, while the lower containment section 35 houses the lead screw 19 and the upper part of the drive shaft 13. In order to exclude reactor gases from the upper containment section 33, and to prevent escape of reactor gases when the containment sections are disconnected, the lower containment section 35 includes a separation barrier 37 which surrounds the lead screw 19 just below the "back-stop" clutch 21. In this regard, exclusion of reactor gases from the upper containment section allows cooling of the operating components therein by an independent, closed cooling system. As a result, the upper containment section 33 can be maintained at a much lower temperature than if reactor gases were permitted therein, and less expensive, lower temperature equipment can be employed. Suitable gaskets (not shown) prevent fluid passage across the joint between the upper and lower containment sections.

The upper containment section 33 includes suitable structural members which serve to support various of the components located therein. More particularly, such structural members include a transverse platform 39 dividing the upper containment section into upper and lower chambers 41 and 43, and a cylindrical shell 45 which suspends from the platform 39 and divides the lower chamber 43 into concentric inner and outer annular cavities or voids 47 and 49. At its upper end the upper containment section 29 includes a threaded cap 51 which can be removed to permit access to the interior of the upper section. A fluid tight seal is normally maintained between the cap 51 and the remainder of the upper section 33 by a suitable gasket 53. Preferably, the cap 51 also contains an access plug 55 which is in alignment with the axis of the lead screw 19 and can be removed to facilitate disconnection of the control rod from the drive shaft 13.

The lower containment section 35 includes a main part 57 which is connected at its upper end to the upper containment section 33 and an extension part 59 which is threadedly joined to the lower end of the main part 57. The extension part projects into and is suitably fixedly connected to the shield 12 of the reactor 14. In the case of a gas cooled reactor, the extension part 59 is fixed to the top of the pressure vessel containing the reactive core.

Pressure fluid for driving the "scram" motor 23 can be stored exteriorly of the containment 11, or within the containment. In the disclosed construction, the pressure fluid is stored in an accumulator 63 formed by fabricating the main part 57 of the lower containment section with spaced double walls 65 and 67, thereby providing a closed chamber which is concentric with the drive shaft 13. Connected to the accumulator 63 is a supply conduit 69 which leads from a suitable source of pressure fluid and which, adjacent the chamber, includes a check valve 71 to prevent loss of pressure from the chamber in the event of a rupture in the supply conduit 69.

The disclosed lead screw 19 is preferably of tubular construction to permit passage through the lead screw and drive shaft of suitable devices for operating a coupling or disconnect mechanism 68 which is secured to the lower end of the drive shaft and serves to detachably connect the control rod to the control rod drive.

As pointed out before, the disclosed connecting shaft 17 is housed essentially in the upper containment section 33 and is connectable to the lead screw 19 in the lower containment section 35. The connecting shaft is also of tubular construction to allow passage therethrough of suitable devices for operating the disconnect mechanism 68. In the upper containment section 33, the connecting shaft 17 is journalled, in part, by the clutch 25 and by a bearing 73 located adjacent to the bottom of the upper containment section.

In the lower containment section 35, the lead screw 19 is journalled at its upper end in an upper bearing 75 supported on a flanged collar 77 located somewhat below the upper end of the main part 57 of the lower containment section and in a lower bearing 76 located below the collar 77. The upper bearing 75 is constructed so as to journal the upper end of the lead screw 19, as well as to resist axial displacement of the lead screw in either direction. A gasket 79 is provided between the flanged collar 77 and the containment section 35 to provide a fluid-tight seal therebetween.

Between the bearings 75 and 76, the lead screw 19 passes through the separation barrier 37, and, beneath the bearing 76, includes a lower portion which is threaded with a highly efficient, large angle helix thread. Rotary movement of the lead screw 19 is translated into axial movement of the drive shaft 13 by suitable means which, in the disclosed construction, comprises a ball nut coupling 81. Axial movement of the drive shaft is afforded, while rotation of the drive shaft is prevented, by the incorporation in the outer surface of the drive shaft of a series of lengthwise linear grooves 83 engaged by a ball spline 85 located adjacent the lower end of the main part 57 of the lower containment section 35. The drive shaft 13 is also supported for linear movement by a bearing 87 at the lower end of the extension part 59 of the lower containment section.

Alignment of the lower end of the lead screw 19 within the drive shaft 13 is maintained by a bearing 89 carried by the lower end of the lead screw for engagement with the inner surface of the drive shaft to permit both linear and rotative relative movement therebetween.

The "back-stop" clutch 21 serves, as already pointed out, to drivingly connect the connecting shaft 17 to the lead screw 19. In addition, the clutch serves to prevent feed-back rotation of the lead screw and accompanying axial displacement of the drive shaft 13 by reason of forces acting axially of the drive shaft. This feature is particularly important when the upper section of the control rod drive is removed from the lower section, thereby disconnecting the lead screw 19 from the drive components in the upper containment section 33.

Axial forces tending to displace the drive shaft are encountered, for example, by reason of the weight of the drive shaft and control rod. Also when the drive is used in connection with a gas cooled reactor, the orientation of the control rod and drive shaft across the pressure drop associated with coolant flow also serves to create a force acting axially on the control rod and drive shaft. In addition, the inertia which is created by rapid advancement of the control rod and drive shaft during "scram" insertion of the control rod also serves to exert force which opposes deceleration of the drive shaft as the control rod approaches its fully inserted position.

In the disclosed construction, the "back-stop" clutch 21 is a sprag type clutch, including, in part, an outer race 91 which is fixed relative to the containment section 35, except for some limited movement for the purpose of absorbing energy, an out-put member 93 which is supported for rotation by the outer race 91 and is keyed to the upper end of the lead screw 19, and an in-put member 95 which is also supported for rotation by the outer race 91, and includes a splined socket 96 for removably receiving the splined lower end of the connecting shaft 17. The in-put member 95 also includes as seen best in FIGURES 2, 3, and 4, a series of fingers 97 which extend into an annular recess 98 between one portion of the out-put member 93 and the outer race 91. Also located in the recess, are a series of pairs of sprags 99, one pair being associated with each of the in-put member fingers 97, with one sprag being located on each side of the associated finger. The sprags 99 are connected by a garter spring 101 so as to retain them in proper position relative to the in-put and out-put members, and to the outer race.

In operation, as shown in FIGURE 2, when the in-put member 95 is driven by the connecting shaft 17 in a counterclockwise direction, the sprag 99 seen to the left in FIGURE 2, is drivingly connected between the in-put and out-put members 95 and 93 as defined by positive driving conditions, and is free to rotate relative to the outer race 91. The sprag 99 shown to the right in FIGURE 2 is carried along behind the associated in-put member finger 97 incident to rotation of the in-put member. When the in-put member 95 is driven in the opposite or clockwise direction, the sprag shown to the right in FIGURE 2 will be drivingly connected between the in-put and out-put members 95 and 93.

However, when forces acting axially of the drive shaft 13 attempt to rotate the lead screw 19, which is positively connected to the out-put member 93, so as to over power the in-put member 95, the sprags 99 lock between the out-put member 93 and the outer race 91, thereby preventing feed-back rotation. For example, as seen in FIGURE 3, if the out-put member 93 attempts to rotate in the clockwise direction, the radially outward end of the sprag 99 shown to the right in FIGURE 3, binds against the outer race 91 to prevent rotation. If the out-put member 93 is driven in the opposite or counterclockwise direction, then the sprag seen to the left in FIGURE 3 will bind with the outer race 91 to prevent feed-back rotation.

As already pointed out, the inertia of the control rod and drive shaft sets up forces acting axially of the drive shaft toward the reactive core when the lead screw is decelerated by the "scram" motor 23 as the control rod approaches its fully inserted position. Under these conditions, the sprags 99 bind between the out-put member 93 and the outer race 91. Such binding of the sprags occurs incident to a relatively small amount of rotation between the out-put member and the outer race. The energy which attempts to drive the out-put member is therefore dissipated within this relatively small amount of movement, and as a result, particularly high stresses are created in the sprags 99.

In order to avoid such stresses, and thereby avoid excessive wear and possible fracture of the components of the "back-stop" clutch 21, an energy absorbing means 103 is associated with the outer race 91 of the "back-stop" clutch. Various energy absorbing arrangements can be used. In the disclosed construction, a series of spring loaded brake shoes 105 are arranged around the outer periphery of the outer race 91 to permit limited rotative movement of the outer race 91 when the sprags 99 lock-up between the out-put member 93 and the outer race. The restraint which is imposed by the brake shoes 105 should, at least, be sufficient to prevent control rod expulsion as a result of reactor pressures and to prevent axial displacement of the drive shaft and control rod by their own weight, when the upper driven section is removed.

The separation barrier 37 constitutes a seal which contains the reactor pressure so as to prevent escape of reactor gases out of the lower containment section 35 from around the upper end of the lead screw 19. The incorporation of the separation barrier 37, together with the separable connecting shaft 17 and "back-stop" clutch 21, permits separation and removal of the upper part of the control rod drive from the lower containment section 35, as for instance, for repair and/or maintenance of any of the components in the upper containment section, without exposing the surrounding atmosphere to reactor gases. In addition, as the reactor gases cannot escape through the separation barrier, a "clean" coolant gas can be circulated in the upper containment section 33 to lower the temperature in the upper containment section, and thereby permit use of equipment which would otherwise deteriorate under higher temperature conditions.

Various types of seals can be used to provide the separation barrier 37. For instance, a pressure break-down labyrinth type of seal can be employed. Alternately, a face type of seal can be used, i.e., a sealing element or member which is located between opposed flanges or collars. In the disclosed construction, a pair of spaced bushing type seals 107 are employed, which seals are each in the form of a ring.

As already pointed out, the connecting shaft is directly connected to the "scram" motor 23 and is detachably connected to the positioning motor 27.

More particularly, the positioning motor 27 is a reversible electric motor mounted in concentric relation to the connecting shaft 17 within the inner annular void 47 and is releasably connected to the connecting shaft by the clutch 25. Under normal operating conditions, the clutch drivingly engages the positioning motor 27 with the connecting shaft 17. However, under "scram" conditions, the clutch 25 disconnects the positioning motor 27 from the connecting shaft 17, thereby preventing over-running of the positioning motor by the "scram" motor 23.

Although various forms of clutches can be used, including electromagnetic type clutches, the disclosed construction utilizes a conventional sprag type of clutch which is shown diagrammatically in the drawings and which is suitably supported in the inner annular void 47. The sprag type of clutch includes one member which is directly coupled to the connecting shaft 17 and a second member which is coupled to the rotor of the positioning motor 27. The members are connected by a series of sprags which are disposed between the first and second members and which are held in position, at least in part, by a suitable spring member. In operation of the particular disclosed construction, the sprag clutch connects the positioning motor 27 to the connecting shaft 17 for extension and withdrawal of the drive shaft 13 relative to the reactive core. When the "scram" motor 23 is energized so as to axially displace the drive shaft 13 rapidly toward the reactive core, the sprag clutch automatically disconnects the positioning motor 27 from the connecting shaft 17.

Also included in the disclosed construction is a brake 109 which is connected to the positioning motor 27 and functions to lock the positioning motor when the positioning motor is de-energized. If desired, the brake 109 could be directly incorporated in the positioning motor 27.

More particularly the brake 109 employed in the disclosed construction is a spring set magnetically released brake of well-known construction, which brake functions whenever the positioning motor is de-energized to prevent contined rotation of the positioning motor 27. The brake is wired with the positioning motor, and accordingly, whenever energy is supplied to the positioning motor, the brake is also energized to effect magnetic release of the positioning motor for rotation. Specifically, energizing of the brake sets up a magnetic force which overpowers the spring braking force, thereby permitting operation of the positioning motor. However, when the current to the positioning motor is interrupted, the spring action of the brake immediately takes over to prevent rotation of the positioning motor.

The "scram" motor 23, as previously explained, is coupled directly to the connecting shaft 17 and operates under the influence of pressure fluid to rapidly axially displace the drive shaft inwardly toward the reactive core. Various types of pneumatic motors can be utilized and in the disclosed construction, a nutating disc type motor is employed. As is well known, this type of motor employs a series of pistons 111 which are generally arranged in a circular formation for operation against a member or nutating disc 113 which is secured at an incline to the output or drive shaft of the motor. Successive exposure of the pistons to the pressure fluid causes rotation of the inclined member and accompanying rotation of the out-put shaft. A nutating disc type motor operating on the principle of pressure differential across the disc and without pistons also may be utilized. As shown best in FIGURE 1, the "scram" motor is mounted in the upper chamber 41 on the platform 39 and is directly connected to the connecting shaft 17 by a suitable coupling 117. As also shown in FIG. 1, the motor is constructed so as to include a central bore 119 which communicates through the bore in the connecting shaft with the bore in the lead screw 19 and, when the plug 55 in the cap 51 is removed, permits operation of the disconnect mechanism 68 by a tool positionable through the bores in the "scram" motor, connecting shaft, and lead screw.

The "scram" motor also includes an intake or supply port 123 and an outlet or exhaust port 125. The supply port 123 is connected by suitable piping 127 to the accumulator 63, which piping is located wholly within the containment, while the exhaust port 125 is connected through suitable piping 129 to a low pressure receiver located outside of the containment 11.

The flow of pressure fluid from the accumulator 63 to the "scram" motor 23 is controlled by the "scram" valve 29 which is located within the upper containment section 33. The "scram" valve 29 operates in response to a pre-arranged signal to connect the accumulator 63 to the intake port 123 so as to facilitate "scram" displacement of the drive shaft 13 toward the reactive core. At the same time, the "scram" valve also operates to connect the exhaust port 125 of the "scram motor 23 to the modulating or throttling valve 31 which is connected in the piping 129 leading to the low pressure receiver and which controls the rate of operation of the "scram" motor. At other times, i.e., under normal operating conditions, the "scram" valve 29 connects the intake port 123 of the "scram" motor 23 to the discharge port 125 to afford free rotation of the "scram" motor when the connecting shaft 17 is rotated by the positioning motor 27. More particularly, in the disclosed construction, the "scram" valve 29 is a pilot operated two position, four way valve actuated by a solenoid and connected to both the intake and exhaust ports 123 and 125 as well as to the accumulator 63 and to the modulating valve 31.

Also located in the piping 127 between the accumulator 63 and the "scram" motor 23 is a regulator valve 131 which reduces the pressure in the fluid flowing to the "scram" motor from the pressure level in the accumulator to the pressure level at which the "scram" motor is preferably operated. In the disclosed construction, the regulator valve 131 is located between the accumulator 63 and the "scram" valve 29.

As noted before, deceleration of the "scram" motor 23, incident to full insertion of the control rod toward the core, is provided by the modulating valve 31 which is located in the piping 129 connecting the "scram" valve 29 to the low pressure receiver. Essentially, the modulating valve 31 acts to throttle and eventually close off the flow of fluid from the "scram" motor 23, thereby causing the "scram" motor to function as a compressor which serves to apply a restraining torque to the connecting shaft 17 so as to decelerate inward movement of the drive shaft 13. Various constructions can be utilized to obtain the desired throttling action. In the disclosed construction, the modulating valve 31 includes a piston 133 which is geared to the connecting shaft 17 and which travels relative to an orifice to provide a variable area flow passageway 135 incident to rotation of the connecting shaft. In this regard, as the drive shaft 13 approaches its fully extended position, accompanying movement of the piston 133 progressively closes the variable area flow passageway 135. Thus, flow of exhaust fluid from the "scram" motor 23 is controlled to decelerate the travel of the drive shaft 13 as it approaches its fully inserted position. When the drive shaft reaches its fully inserted position, the modulating valve 31 is completely closed.

More specifically, the modulating valve 31 is suitably mounted in the outer void 49 of the lower chamber 43 of the upper containment section 33 and includes a housing 137 which is connected, at one end, to the piping 129 leading to the "scram" valve 29. At its other or discharge end, the housing is connected through the piping 129 to the low pressure receiver. The housing 137 includes a generally cylindrical cavity 139 through which the piston 133 is movable and which has intermediate its ends a circumferential shoulder 141 which, together with the piston 133, defines the variable area flow passageway 135. The piston 133 is also generally cylindrical, except for a series of lengthwise grooves 143 spaced around its periphery, which grooves extend from a base portion 145 of the piston adjacent the discharge end of the housing 137 and define therebetween a series of fins which are engageable with the shoulder 141 to assist in guiding movement of the piston between its fully open and fully closed positions. Each groove 143 has a depth which increases toward the discharge end of the housing so as to provide, relative to the shoulder 141, a progressively greater flow area adjacent the base portion 145 of the piston 133. In order to provide communication between the discharge end of the cavity 139 and the grooves 143, the base portion 145 includes a suitable number of bores or conduits (not shown).

The piston is carried for axial movement relative to the cavity 139 by threaded engagement on a shaft 147 which extends through the lower wall of the housing 137 and is journalled in the bottom wall of the upper containment section 33. Means (not shown) are also provided to prevent rotation of the piston 133 with the shaft 147 incident to rotation of the shaft. Keyed to the shaft 174 externally of the housing 137 is a gear 149 which, in turn, is connected through another gear 151 to a gear 153 keyed to the connecting shaft 17. Thus, rotation of the lead screw causes rotation of the shaft 147 such that the piston 133 is caused to move axially relative to the shaft 147 and to the shoulder 141 in the modulating valve 31. Movement of the piston relative to the shoulder 141 determines the area of the flow passageway 135 available for flow of exhaust fluid from the "scram" motor 23. Accordingly, by varying the available area of the flow passageway 135, and mass volume of fluid flowing through the "scram" motor 23 can be controlled, thereby regulating the rate of operation of the "scram" motor.

Also meshed with the gear 153 is another gear 155 which, in turn, is meshed with a gear 157 on a shaft 159 extending from a position transmitter 161 located in the outer annular void 49. The position transmitter functions to convert the mechanical input of the shaft 159 into an electrical signal which is readable at a point exterior to the containment so as to indicate the location of the drive shaft 13 relative to the reactive core. This reading, of course, indicates the extent to which the control rod is inserted within the reactor core.

In operation under normal conditions, the positioning motor 27 can be energized to extend or withdraw the drive shaft 13 and accompanying control rod either toward or away from the reactive core of the reactor. When the positioning motor 27 is de-energized, the spring set brake 109 prohibits rotation of the positioning motor 27 and also acts to prevent rotation of the connecting shaft 17 accompanying axial displacement of the drive shaft 13 when the connecting shaft 17 is coupled to the positioning motor 27 by the clutch 25. However, upon reenergization of the positioning motor, the brake 109 is magnetically released to permit rotation of the positioning motor, thereby driving the lead screw so as to displace the control rod as desired.

During normal operations, the "scram" valve 29 closes off communication between the accumulator 63 and the intake port 123 of the "scram" motor 23, and between the exhaust port 125 of the "scram" motor and the modulating valve 31. In addition, the "scram" valve 29 acts to connect the intake and exhaust ports 123 and 125 of the "scram" motor 23 to permit free wheeling of the "scram" motor incident to rotation of the connecting shaft 17 by the positioning motor 27. If desired, the fluid which recirculates through the "scram" motor under normal drive conditions can be pressurized so that a more prompt operation of the "scram" motor 23 will occur incident to the occurrence of a "scram" condition.

Should a "scram" condition develop, the "scram" valve 29 operates to connect the accumulator 63 to the intake port 123 of the "scram" motor 23 and to connect the exhaust port 125 of the "scram" motor to the modulating valve 31, and through the modulating valve, to the low pressure receiver (not shown). Entry of pressure fluid into the "scram" motor causes rapid rotation thereof and accompanying rapid rotation of the connecting shaft 17 in the direction which is effective to axially displace the drive shaft 13 in the direction toward the reactive core. This rapid rotation of the connecting shaft 17 causes the clutch 25 to disconnect the connecting shaft 17 from the positioning motor 27, thereby protecting the positioning motor from overrunning.

As the drive shaft 13 approaches its fully extended position, the piston 133 of the modulating valve 31 is moved through the orifice until the flow passageway 135 is closed, thereby slowing and eventually stopping the "scram" motor so as to prevent overdriving of the connecting shaft 17, and consequent excessive displacement of the drive shaft 13 beyond its fully inserted position within the reactive core. When the "scram" condition no longer prevails, the "scram" valve 29 will return to its normal operational setting and the positioning motor 27 will again be engaged with the connecting shaft 17 by action of the sprag clutch 25 so as to locate the drive shaft and associated control rod as desired in response to energizing the positioning motor.

If desired, the arrangement disclosed for driving the connecting shaft can also be advantageously used in control rod drive constructions other than as shown herein. For instance, the drive arrangement can also be employed when the connecting shaft is utilized to position a control rod in a direction transverse to the axis of the connecting shaft. In such an arrangement, the connecting shaft would incorporate, instead of connection with a ball nut and lead screw, a gear in mesh with a rack secured to an element which is connected to the control rod and which is movable axially in the direction of the desired control rod movement. Another construction is the use of a bevel gear coupling between the connecting shaft and ball nut lead screw combination to attain any angle desired between the upper and lower sections of the drive mechanism.

Various of the features of the invention are set forth in the appended claims.

What is claimed is:

1. A control rod drive for a nuclear reactor, said drive comprising a drive shaft carried for axial movement toward and away from the reactive core of the reactor, the end of said drive shaft adjacent to the reactive core being adapted for connection with a control rod, a lead screw extending within said drive shaft from the other end thereof, means connecting said lead screw and said drive shaft so as to cause relative movement of said drive shaft axially of said lead screw incident to rotation of said lead screw, a fluid motor drivingly connected to said lead screw for rotational driving thereof, an electric motor, a clutch releasably connecting said electric motor to said lead screw so as to facilitate positioning of said drive shaft under normal conditions, said clutch disconnecting said electric motor from said lead screw incident to rotation of said lead screw by said fluid motor thereby permitting free movement of said lead screw relative to said electric motor, means for supplying pressure fluid to said fluid motor in response to development of a scram condition in the reactor so as to rapidly rotate said lead screw thereby displacing said drive shaft toward the reactive core of the reactor, and means including a valve communicating with said fluid motor and operably connected to said lead screw for throttling the flow of pressure fluid through said fluid motor so as to decelerate said lead screw as the drive shaft approaches the limit of its travel toward the reactive core of the reactor.

2. A control rod drive for a fluid-cooled nuclear reactor including a pressure vessel housing a reactive core, said drive comprising a containment including a first section connected to the pressure vessel and extending toward the reactive core and a second section detachably secured to said first section, an elongated hollow drive shaft carried by said first containment section for axial movement toward and away from the reactive core, the end of said drive shaft adjacent to the reactive core extending into the pressure vessel being open and being adapted for connection with a control rod, a lead screw located in said first containment section and extending within said drive shaft from the other end thereof, a connecting shaft extending from within said second containment section for detachably connection with said lead screw so as to rotate said lead screw incident to rotation of said connecting shaft, means connecting said lead screw and said drive shaft so as to cause relative movement of said drive shaft axially of said lead screw incident to rotation of said lead screw, sealing means located in said first containment section between said first containment section and said lead screw and outwardly with respect to the core from said means connecting said lead screw and said drive shaft so as to prevent escape of fluid coolant from said first containment section, clutch means located in said first containment section and connected with said lead screw to prevent "feed-back" rotation of said lead screw by a force applied axially of said drive shaft, a fluid motor connected directly to said connecting shaft for rotational driving thereof, an electric motor, a clutch releasably connecting said electric motor to said connecting shaft so as to facilitate positioning of said drive shaft under normal conditions, said clutch disconnecting said electric motor from said connecting shaft incident to rotation of said connecting shaft by said fluid motor, thereby permitting free movement of said connecting shaft and lead screw relative to said electric motor, and means for supplying pressure fluid to said fluid motor in response to development of a scram condition in the reactor so as to rapidly rotate said connecting shaft and lead screw, thereby displacing said drive shaft toward the reactive core of the reactor.

3. A control rod drive for a fluid-cooled nuclear reactor including a pressure vessel housing a reactive core, said drive comprising a containment including a first section connected to the pressure vessel and extending toward the reactive core and a second section detachably secured to said first section, an elongated hollow drive shaft carried by said first containment section for axial movement toward and away from the reactive core, the end of said drive shaft adjacent to the reactive core extending into the pressure vessel being open and being adapted for connection with a control rod, a lead screw located in said first containment section and extending within said drive shaft from the other end thereof, a connecting shaft extending from within said second containment section for detachable connection with said lead screw so as to rotate said lead screw incident to rotation of said connecting shaft, means connecting said lead screw and said drive shaft so as to cause relative movement of said drive shaft axially of said lead screw incident to rotation of said lead screw, sealing means located in said first containment section between said first containment section and said lead screw and outwardly with respect to the core from said means connecting said lead screw and said drive shaft so as to prevent escape of fluid coolant from said first containment section, clutch means located in said first containment section and connected with said lead screw to prevent "feedback" rotation of said lead screw by a force applied axially of said drive shaft, means connecting said clutch means and said first containment section for absorbing energy incident to prevention of "feedback" rotation, a fluid motor connected directly to said connecting shaft for rotational driving thereof, an electric motor, a clutch releasably connecting said electric motor to said connecting shaft so as to facilitate positioning of said drive shaft under normal conditions, said clutch disconnecting said electric motor from said connecting shaft incident to rotation of said connecting shaft by said fluid motor, thereby permitting free movement of said connecting shaft and lead screw relative to said electric motor, and means for supplying pressure fluid to said fluid motor in response to development of a scram condition in the reactor so as to rapidly rotate said connecting shaft and said lead screw, thereby displacing said drive shaft toward the reactive core of the reactor.

4. A control rod drive for a nuclear reactor, said drive comprising a containment, a lead screw adapted at one end for connection with a control rod and adapted for positioning the control rod relative to the reactive core of the reactor incident to rotation of said lead screw, said lead screw being rotatably mounted in and at least partially disposed in said containment, a connecting shaft rotatably mounted in said containment, clutch means located in said containment and connecting the other end of said lead screw to said connecting shaft so as to rotate said lead screw incident to rotation of said connecting shaft, said clutch means also preventing "feed-back"

rotation of said lead screw in response to forces applied axially of the control rod, means connected with said clutch means for absorbing energy incident to prevention of "feed-back" rotation, a fluid motor connected directly to said connecting shaft for rotational driving thereof, an electric motor, a clutch releasably connecting said electric motor to said connecting shaft so as to facilitate rotation of said connecting shaft and lead screw under normal conditions, said clutch disconnecting said electric motor from said connecting shaft incident to rotation of said connecting shaft by said fluid motor, thereby permitting free movement of said connecting shaft and lead screw relative to said electric motor, and means for supplying pressure fluid to said fluid motor in response to development of a scram condition in the reactor so as to rapidly rotate said connecting shaft and lead screw, thereby rapidly driving the control rod toward the reactive core of the reactor.

References Cited in the file of this patent

UNITED STATES PATENTS

| | | |
|---|---|---|
| 2,937,984 | Chapellier | May 24, 1960 |
| 3,031,397 | Fortescue et al. | Apr. 24, 1961 |

OTHER REFERENCES

Schultz: "Control of Nuclear Reactors and Power Plants," publ. by McGraw-Hill, Mar. 6, 1961, 2nd ed., pp. 227, 242, 243.